July 26, 1960
M. K. FAIRCHILD ET AL
2,946,339
INERTIA VALVE
Filed Feb. 27, 1956
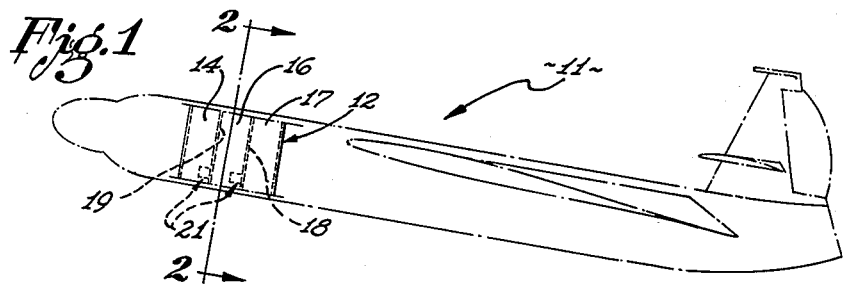
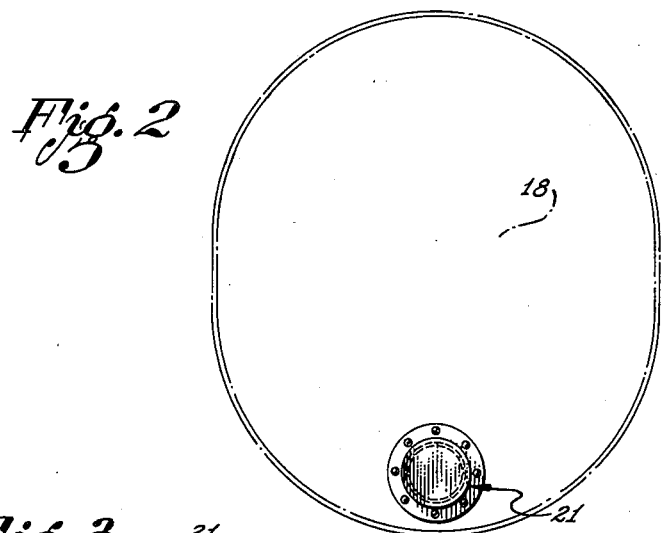
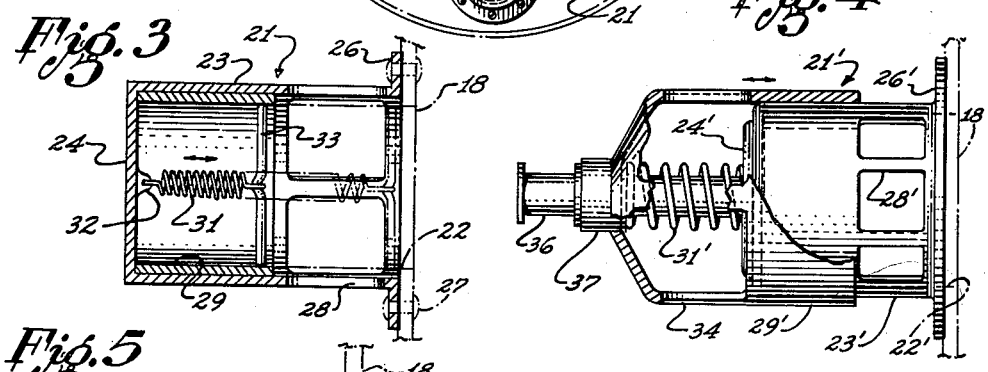
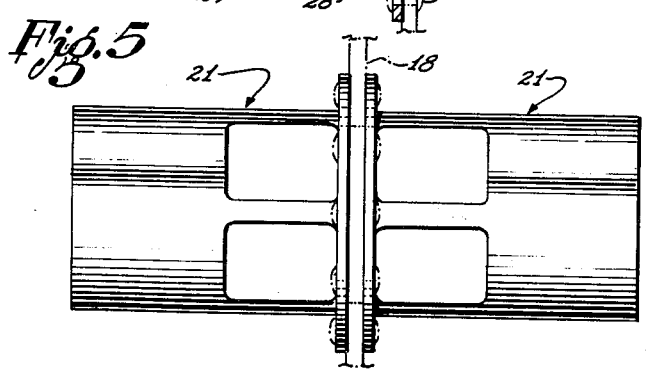
INVENTORS.
Marl K. Fairchild
Charles W. Maxfield
Bernard P. Brady
Their Patent Attorney

United States Patent Office 2,946,339
Patented July 26, 1960

2,946,339

INERTIA VALVE

Merl K. Fairchild, Torrance, Charles W. Maxfield, Los Angeles, and Bernard P. Brady, Torrance, Calif., assignors to Northrop Corporation, a corporation of California Filed Feb. 27, 1956, Ser. No. 567,735

3 Claims. (Cl. 137—38)

This invention relates to valves and more particularly to an inertia type valve having special utility in preventing fuel surge in compartmented tanks and the like during periods of excessive acceleration.

It is well known that fuel contained in aircraft fuel cells shifts rapidly and quite frequently violently at such time as the aircraft in which the cells are mounted accelerates, decelerates or suddenly changes its flight course. In many instances such a shifting of the liquid fuel subjects the cell and structural members of the aircraft to stress exceeding that which they are designed to withstand. Further, the shifting of the liquid fuel results in a shifting of the center of gravity of the fuel cell and accordingly of the aircraft itself. This center of gravity shift may adversely affect the attitude of an aircraft during a critical phase of its operation. For example, it is extremely important that the center of gravity of a pilotless missile be maintained at a fixed position within the missile during the launching phase of the missile. Therefore it is important that the missile's fuel supply is not permitted to shift during a launching operation.

Accordingly it is an object of this invention to provide a fluid valve which is responsive to inertial forces and which, when mounted between communicating fuel cells or the like, functions to prevent fuel surge therebetween at such time as the cells are subject to excessive acceleration.

Another object is to provide a fluid valve functioning to control the surge of liquid fuel or the like between communicating cells or adjacent compartments of a unitary fuel cell at such times as the cells are subjected to excessive acceleration and which operates independently of fuel surge which may occur within the subject cells.

Another object is to provide a fluid valve functioning to control the surge of liquid fuel between communicating cells or adjacent communicating compartments of a unitary fuel cell at such times as the cells are subjected to excessive acceleration and which operates equally well although unequal fluid heads are present in the communicating cells or adjacent compartments.

Another object is to provide a fluid valve for effectively controlling the surge of liquid fuel between communicating cells or adjacent communicating compartments of a unitary fuel cell which is simple in design yet rugged in construction, which is economical to manufacture, and which because of few operating parts is quite unlikely to malfunction.

Although the characteristic features of the present invention are particularly pointed out in the appended claims, the invention itself, also the manner in which it may be carried out, will be better understood by referring to the following description taken in connection with the accompanying drawings forming a part of this application and in which:

Figure 1 is a side elevational view of a pilotless missile positioned in a launching attitude and utilizing valves of the type disclosed herein to control fuel surge between the various compartments of a fuel cell mounted in the missile.

Figure 2 is a cross-sectional view taken along the line 2—2 of Figure 1.

Figure 3 is a longitudinal cross-sectional view of the valve shown in Figure 2.

Figure 4 is a view similar to Figure 3 but showing a different embodiment of the valve as disclosed herein.

Figure 5 is a view similar to Figure 3 but showing the manner of mounting duplicate valves to control fuel surge in both directions normal to a partition wall.

Referring to the drawings for a detailed description of a specific embodiment of the surge preventing valve as disclosed herein, Figure 1 shows a pilotless missile 11 positioned in a launching attitude. Also shown in this figure is a fuel cell 12 located in the forward portion of the fuselage of the missile 11. The cell 12 is of elongated configuration in a fore and aft direction and is divided into a plurality of compartments 14, 16, and 17 by longitudinally spaced partition walls 18 and 19. Mounted on the forward side of each of the walls 18 and 19 is a surge preventing valve 21.

A missile of the type shown in Figure 1 is normally launched by means of "JATO" type rockets (not shown) which materially augment the thrust of the missile's engine and subject the missile to violent acceleration. During the launching period it is extremely important that the center of gravity of the combined mass of the loaded missile, "JATO" rockets, and various mechanical devices for attachment and ejection of the rockets, remain as nearly fixed as possible. For the above reason it is important that the fuel is not allowed to surge or shift during the launching period as this would be a contributing factor in causing the C.G. of the missile to shift. Also a surge or shift of fuel within the cell 12 is highly undesirable as it subjects the cell walls and certain structural members of the missile to excessive stress.

Referring to Figures 2 and 3 one embodiment of the surge preventing valve 21 is shown on an enlarged scale. The wall 18 shown in phantom construction is ported at 22. The port 22 is of circular configuration and is located a small distance above the lower portion of the wall 18 to permit fuel flow between adjacent compartments at practically all levels of fuel in the fuel cell.

The valve 21 consists of a cylindrical housing 23 the outer end of which is closed by an end wall 24. An integrally formed flange 26, located at the inner end of the housing 23, provides means for attaching the latter to the wall 18 as by rivets 27 or the like. In the assembled position of the housing 23 on the wall 18 the housing is concentrically located with respect to the port 22, the port 22 being slightly less in diameter than the inside diameter of the housing 23. A plurality of circumferentially spaced openings 28 are provided in the cylindrical wall of the housing 23 adjacent the flange 26.

Mounted in sliding relationship within the housing 23 is a cylindrical sleeve element 29 which is open at both ends and is of slightly less length than the distance between the outermost portions of the openings 28 and the wall 24. As mounted the sleeve element is movable between a first or open position and a second or closed position. The first position is characterized in that the outer end of the sleeve element 29 is bottomed on the wall 24 and the inner end is clear of the openings 28. The second position is characterized in that the inner end of the sleeve element is bottomed on the portions of the partition wall 18 extending inwardly of the housing 23 and the cylindrical walls completely close the openings 28. The openings 28 terminate a sufficient distance from the flange 26 to substantially preclude liquid leakage between the housing 23 and sleeve element 29 at such time as the latter is located in its second or closed position.

The inner cylindrical surface of the housing 23 and the outer cylindrical surface of the sleeve element 29 are lapped or similarly finished to provide mating surfaces which are easily slideable with respect to each other and also to a high degree preclude leakage of liquid therebetween. In this respect it has been found that a steel sleeve positioned within an aluminum housing is most satisfactory although it will be understood that other types of material may be equally satisfactory.

Assuming now that the valve 21 is utilized in the missile 11 of Figure 1 and that the sleeve element is in its open position. It will be apparent that upon a predetermined acceleration of the missile inertia forces will act on the sleeve element causing it to slideably move to its closed position and remain in this position. Inasmuch as it is not desirable to have the sleeve element 29 responsive to slight changes in acceleration of the missile a helical wound spring 31 is utilized to normally maintain the sleeve element in its open position. The spring 31 extends between a lug 32, extending inwardly from the wall 24 and a rod 33, the latter extending diametrically across the sleeve element 29 at the inner end thereof.

The spring 31, having a predetermined spring force, is selected to allow the sleeve element to move to its closed position at such time as the acceleration of the missile equals a predetermined amount. For example, the spring 31 may be selected to allow the sleeve element to move to its closed position at such time as the acceleration of the missile causes a ¼ G force to be exerted on the sleeve element 29.

It will now be apparent that a valve is provided which will arrest fluid surge between the compartments 14, 16, and 17 at such time as the missile is accelerated a predetermined amount. This valve is not affected by fluid surge or fluid pressure but is entirely responsive to inertia forces. Further it will be apparent that the valve 21 will reopen, at such time as the speed of the missile becomes fairly constant, although there may be a difference in liquid heads on opposite sides of the partition wall 18. This latter feature, for example, would not necessarily be true in the case of a flapper type valve. For such a valve a difference in liquid head may result in the valve failing to reopen for reasons which are well known in the art.

The valve 21' shown in Figure 4 is similar to the embodiment shown in Figure 3 and just described. In the embodiment shown in Figure 4, however, the sleeve element 29' is mounted on and mates with the outer cylindrical wall surface of the housing 23'. Also in the latter embodiment the spring 31' is mounted externally of the housing 23' and constitutes a helical wound spring which functions under compression rather than tension as is the case of the spring 31 of Figure 3.

The spring 31' is mounted by means of a yoke member 34 the end portions of which are attached at diametrically opposite positions to the sleeve element 29' as by welding or the like. A rod member 36, extending from the wall 24' and supported at its outer end by a bearing 37 provided by the yoke member 34, provides proper support for the spring 31'. The operation of the valve shown in Figure 4 and just described is substantially the same as the operation of the valve shown in Figure 3 and, therefore, a further discussion in this connection is deemed unnecessary.

The valves as described so far are positioned to arrest fluid surge during periods of acceleration of the missile 11 in a forward direction. However, it should be apparent that the valves 21 or 21' may be positioned on either side of the partition walls of the cell 12 to arrest fluid surge either during periods of acceleration or deceleration of the missile 11. Also it will be apparent that a pair of valves 21 or 21' may be utilized on either side of the partition wall 18, substantially as shown in Figure 5, for arresting fuel surge in first one direction and than the other.

While in order to comply with the statute, the invention has been described in language more or less specific as to structural features, it is to be understood that the invention is not limited to the specific features shown, but that the means and construction herein disclosed comprises the preferred form of putting the invention into effect, and the invention is therefore claimed in any of its forms or modifications within the legitimate and valid scope of the appended claims.

What is claimed is:

1. In an aircraft the combination comprising: a fuel cell mounted in said aircraft and including a ported partition dividing said cell into fore and aft compartments; a valve assembly including fore and aft unitary valves; said unitary valves include respective fore and aft cylindrical members each having a closed end, an open end, and a plurality of ports formed in the side walls thereof at positions adjacent said open ends; said fore and aft cylindrical members being mounted in said fore and aft compartments, respectively, with their open ends surrounding the port in said partition and secured to the latter in abutting relation; fore and aft sleeve members integrated respectively with said fore and aft cylindrical members for slideable movement between respective open and closed positions allowing and arresting fluid flow between said compartments; resilient means adapted to maintain said sleeve members in their respective open positions at such times as said aircraft does not exceed a predetermined acceleration either in a fore or aft direction; and said sleeve members are responsive to inertial forces in that one of said sleeve members moves to its respective closed position while the other of said sleeve members is in its open position and the other of said sleeve members moves to its respective closed position while said one sleeve member is in its open position at such times as said aircraft exceeds said predetermined acceleration in fore and aft directions, respectively.

2. Apparatus as set forth in claim 1: further characterized in that said fore and aft sleeve members are mounted internally of said fore and aft cylindrical members with the outer cylindrical wall surfaces of said sleeve members in complete contact with the inner cylindrical wall surfaces of the cylindrical member in which they are respectively mounted.

3. Apparatus as set forth in claim 1: further characterized in that said fore and aft sleeve members are mounted externally of said fore and aft cylindrical members with the inner cylindrical wall surfaces of said sleeve members in contact with the outer cylindrical wall surfaces of the cylindrical members on which they are respectively mounted.

References Cited in the file of this patent

UNITED STATES PATENTS

| | | |
|---|---|---|
| 2,377,350 | Marsh | June 5, 1945 |
| 2,485,514 | Sturrock | Oct. 18, 1949 |
| 2,678,660 | Gurin | May 18, 1954 |
| 2,733,726 | Kaufman | Feb. 7, 1956 |